United States Patent
Nitta et al.

(10) Patent No.: US 7,250,703 B2
(45) Date of Patent: Jul. 31, 2007

(54) PERMANENT MAGNET MOTOR AND WASHING MACHINE PROVIDED THEREWITH

(75) Inventors: Isamu Nitta, Yokohama (JP); Minoru Awazu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/284,924

(22) Filed: Nov. 23, 2005

(65) Prior Publication Data
US 2006/0108887 A1 May 25, 2006

(30) Foreign Application Priority Data
Nov. 25, 2004 (JP) .............................. 2004-340472

(51) Int. Cl.
*H02K 21/12* (2006.01)
*H02K 1/17* (2006.01)

(52) U.S. Cl. ..................... 310/156.53; 310/156.56; 310/216

(58) Field of Classification Search ........... 310/156.08, 310/156.53, 156.56, 216–218, 156.38, 156.44–156.46
See application file for complete search history.

(56) References Cited

U.S. PATENT DOCUMENTS 6,257,027 B1 * 7/2001 Imai .......................... 68/12.12
6,452,302 B1 * 9/2002 Tajima et al. ................ 310/216

FOREIGN PATENT DOCUMENTS

JP 2004-254403 A 9/2004

* cited by examiner

*Primary Examiner*—Tran Nguyen
(74) *Attorney, Agent, or Firm*—Pillsbury, Winthrop, Shaw, Pittman, LLP

(57) ABSTRACT

A permanent magnet motor includes a rotor core having magnetic pole faces including first to third faces. The first face is formed on a peripherally central part and has a peripherally uniform width of the gap. Each of the second and third faces is formed on both peripheral ends respectively and has a width of a gap rendered larger as each of the second and third faces comes close to a boundary between magnetic poles. The first face ranges from ±15 degrees to ±35 degrees in electrical angle about a center of the magnetic pole and has such a circular arc shape that the gap width is increased by about 10% relative to a minimum gap width.

6 Claims, 5 Drawing Sheets

PERMANENT MAGNET MOTOR AND WASHING MACHINE PROVIDED THEREWITH

CROSS-REFERENCE TO RELATED APPLICATIONS

This application is based upon and claims the benefit of priority from the prior Japanese Patent Application No. 2004-340472, filed on Nov. 25, 2004, the entire contents of which are incorporated herein by reference.

BACKGROUND OF THE INVENTION

1. Field of the Invention

The present invention relates to a permanent magnet motor comprising a rotor including a rotor core made by stacking a plurality of steel plates and a number of permanent magnets serving as field magnets and inserted in magnet insertion holes formed in the rotor core so as to be peripherally aligned, and a washing machine provided with the permanent magnet motor as a drive source.

2. Description of the Related Art

The following motors have conventionally been suggested as motors of the above-described type. A first motor is a permanent magnet motor of the outer rotor type in which an annular rotor core has magnetic poles corresponding to permanent magnets respectively. Each magnetic pole has a magnetic pole face which is opposed to the stator and is an arc face with a center of rotation of the rotor (center of rotational axis) as an arc center. A second motor has as each magnetic pole face an arc face which has a center thereof on a magnetic pole axis passing the center of magnetic pole and is convex to the stator side. For example, JP-A-2004-254403 discloses a permanent magnet motor of this type.

In the motor of this type, the magnetic flux density distribution in the gap between the rotor and stator is shown as a sinusoidal wave. As a result, the motor of this type is superior in the torque development and in the oscillation and noise. On one hand, in the aforesaid first motor, the magnetic flux density distribution takes a trapezoidal shape. As a result, the first motor is low in the fundamental wave component effective for torque development and has a problem of large oscillation and noise.

On the other hand, each magnetic pole face has an arc face convex to the stator side. Accordingly, the magnetic flux density distribution is more sinusoidal in the second than in the first motor. However, the magnetic pole face is a single simple arc face convex to the stator side in the second motor. Accordingly, the magnetic flux of permanent magnets passes through the magnetic pole of the rotor core, concentrating on a single point of a peripherally central portion. The gap is the shortest between the point and the stator. As a result, the magnetic flux density distribution is approximate to a triangular wave, resulting in a problem of large oscillation and noise.

SUMMARY OF THE INVENTION

Therefore, an object of the present disclosure is to provide a permanent magnet motor in which the magnetic flux density distribution of the gap between the rotor core and the stator can be approximated to a sinusoidal wave as close as possible, with the result of improvement in the torque development characteristic and reduction in the oscillation and noise.

The present disclosure provides a permanent magnet motor comprising a stator, a rotor including a rotor core made by stacking a plurality of steel plates and having a plurality of magnetic insertion holes aligned peripherally and a plurality of permanent magnets of a plurality of magnetic poles serving as field magnets and inserted in the magnetic insertion holes respectively. In the motor, the rotor core includes a plurality of magnetic pole sections further including magnetic pole faces opposing the stator from a radial direction with a gap between the stator and the magnetic pole faces, each magnetic pole section having both peripheral ends and including first to third faces, the first face being formed substantially on a peripherally central part thereof and having a substantially peripherally uniform width of the gap, the first face being formed substantially into a circular arc shape, each of the second and third faces being formed on both peripheral ends thereof respectively and having a width of the gap which is rendered larger as each of the second and third faces comes close to a boundary between the magnetic poles. The first face ranges from ±15 degrees to ±35 degrees in electrical angle about a center of the magnetic pole and has such a circular arc shape that the gap width is increased by about 10% relative to a minimum gap width and each of the second and third faces has such a shape that a maximum gap width at the boundary side of the magnetic pole is three times as large as the minimum gap width or above.

BRIEF DESCRIPTION OF THE DRAWINGS

Other objects, features and advantages of the present invention will become clear upon reviewing the following description of the illustrative aspect with reference to the accompanying drawings, in which.

DETAILED DESCRIPTION OF THE INVENTION

Figure 2:
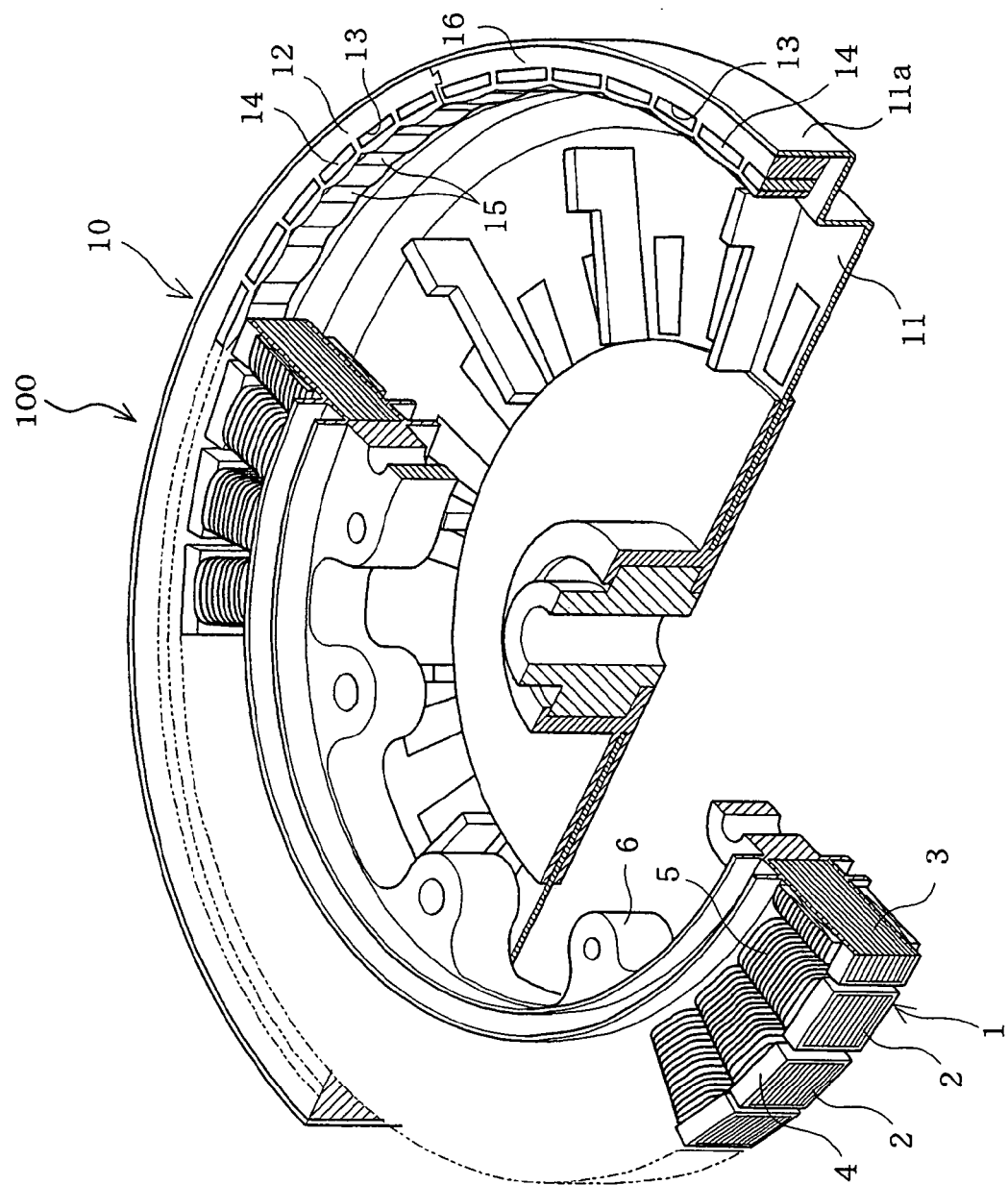
FIG. 2 is a broken perspective view of the motor.
Figure 6:
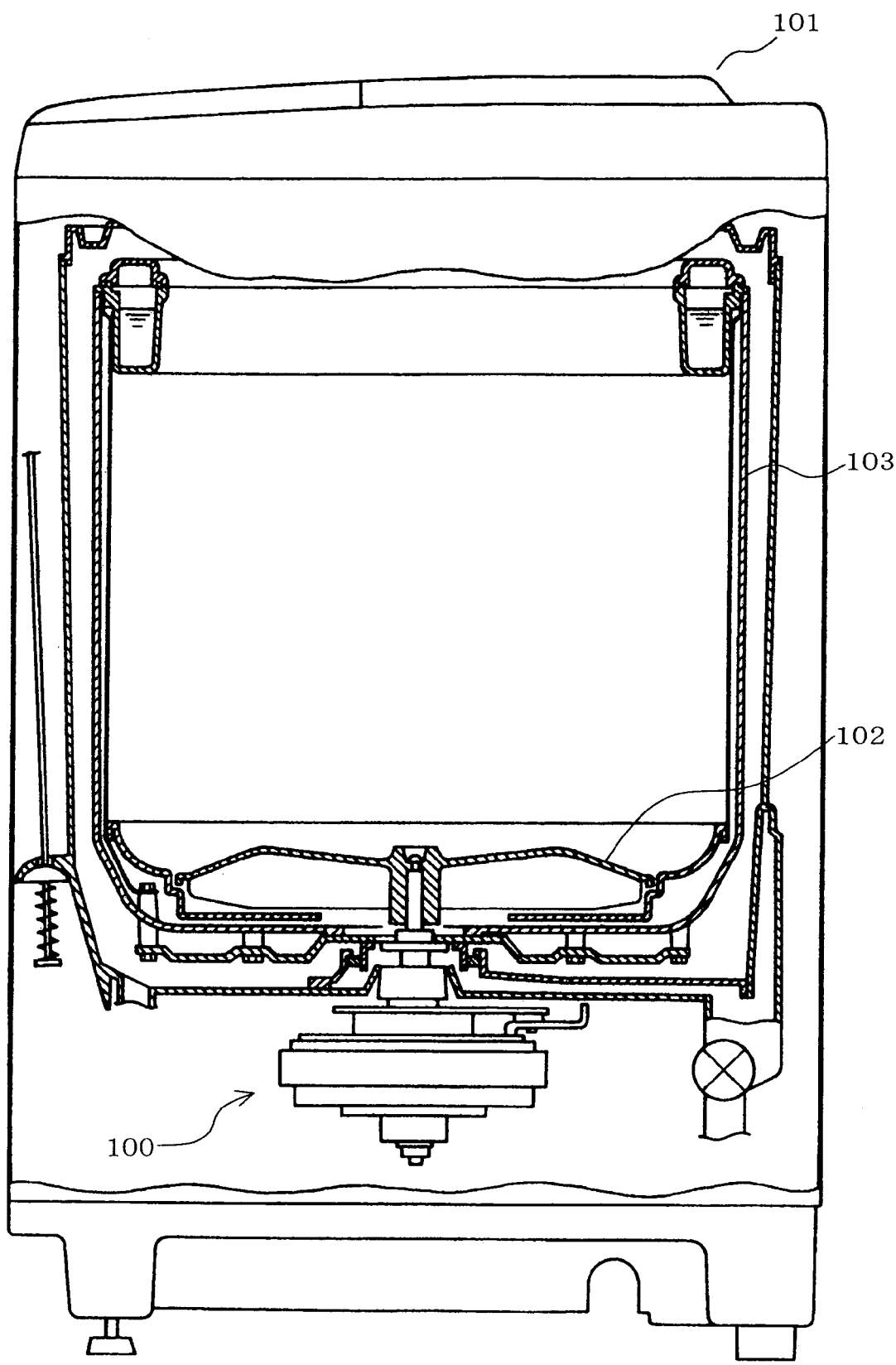
FIG. 6 is a partially broken longitudinal section of an automatic washing machine provided with the permanent magnet motor.

One embodiment of the present invention will be described with reference to the accompanying drawings. Referring to FIG. 2, a permanent magnet motor 100 of the outer rotor type is shown. The motor 100 is used as a drive motor for rotating an agitator 102 during a wash step and for rotating both the agitator and a rotating tub 103 during a dehydration step in an automatic washing machine 101 as shown in FIG. 6. The rotating tub 103 thus serves as a wash tub and a dehydration tub.

The permanent magnet motor 100 includes a stator 1 and a rotor 10. The stator 1 further includes an annular stator core 3 with a number of radially extending teeth 2, a resin 4 covering the stator core 3 and a stator winding 5 wound on the teeth 2. The stator core 3 is made by stacking a number of silicon steel plates and formed into an annular shape. The stator 1 has a plurality of mounting portions 6 formed on an inner periphery thereof. The mounting portions 6 are to be mounted on predetermined portions of the washing machine respectively.

The rotor 10 includes a circular shallow receptacle-shaped frame 11 made of a magnetic material, an annular rotor core 12 disposed on an inner peripheral wall 11a of the frame 11 and having a number of magnet insertion holes 13 formed in an inner periphery thereof, a plurality of permanent magnets 14 inserted in the magnet insertion holes 13 respectively, and a molded resin 15 securing the rotor core 12, permanent magnets 14 and frame 11 together into an integral form. The rotor 10 is disposed so that an inner periphery (distal end of each magnetic pole) of the rotor core 12 opposes distal ends of teeth 2 of the stator core 3 from the radial direction with a predetermined gap therebetween. Accordingly, the rotor core 12 is located radially outside the stator 1. In this case, forty-eight permanent magnets 44 in total are incorporated in the rotor 10. A rotational shaft (not shown) extends through a central hole (not shown) of the rotor 10.

Figure 3:
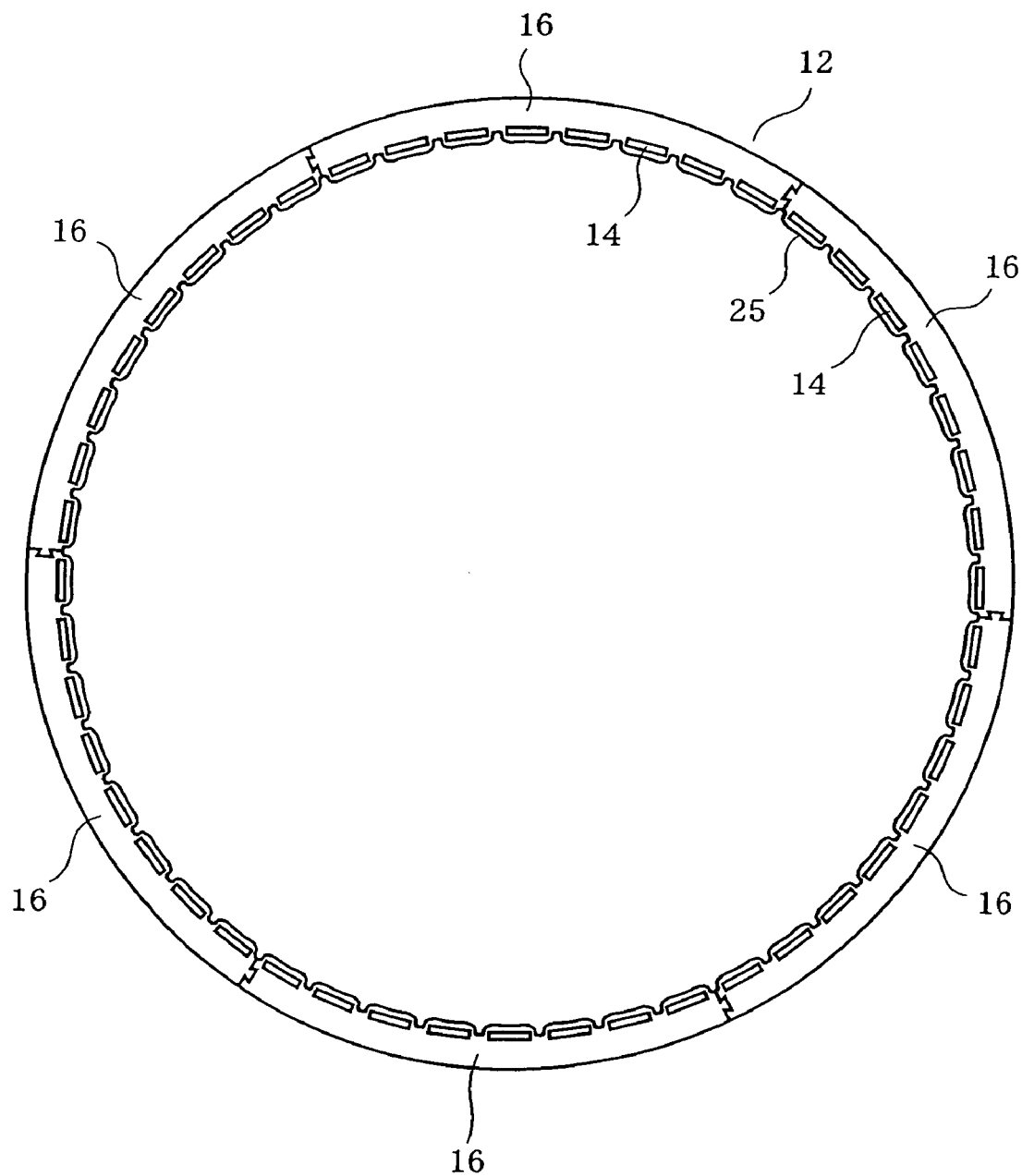
FIG. 3 is a plan view of an overall rotor core.
Figure 4:
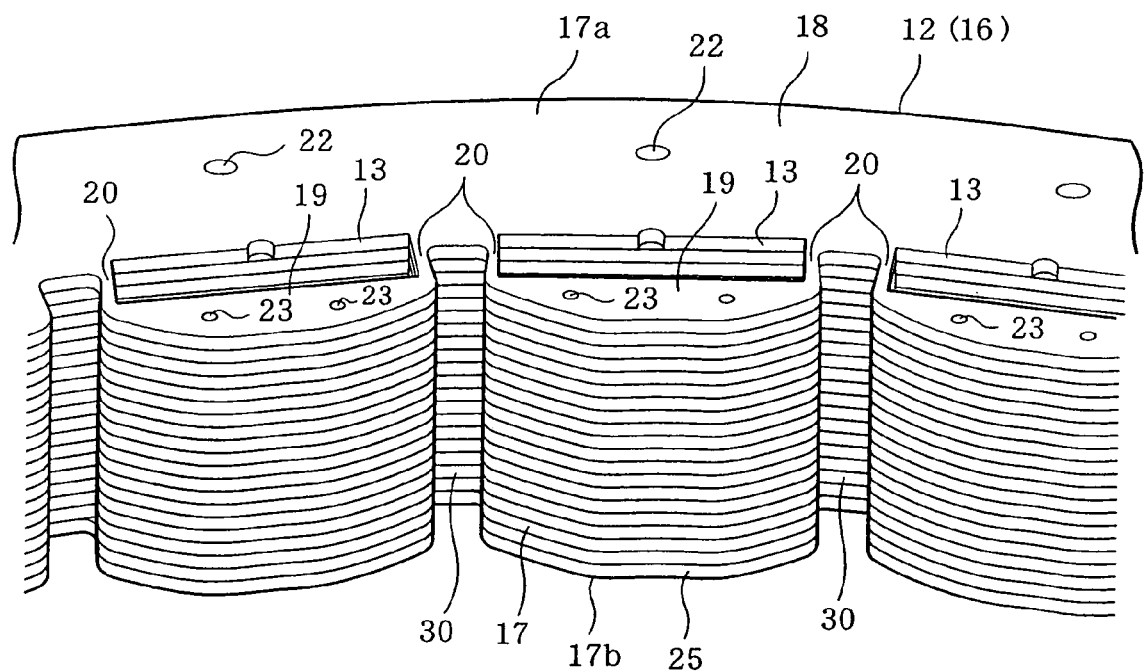
FIG. 4 is a perspective view of several divided core pieces of the rotor core.

Furthermore, the rotor core 12 is divided into a plurality of, for example, six peripherally divided core pieces 16 as shown in FIG. 3. The divided core pieces 16 are assembled into an annular shape. Each divided core piece 16 is formed by stacking a plurality of steel plates such as silicon steel plates as shown in FIG. 4. Each divided core piece 16 has a yoke 18 disposed at an outer peripheral side and a generally crescent magnetic pole section 19 disposed at a stator 1 side of each magnet insertion hole 13. Each divided core piece 16 is sized so as to include eight magnet insertion holes 13, for example. Each magnet insertion hole 13 has a peripherally oblong rectangular shape. A neodymium magnet is used as each permanent magnet 14 inserted into the magnet insertion hole 13. Each permanent magnet 14 is formed into a flat shape corresponding to the magnet insertion hole 13. Furthermore, the permanent magnets 14 are magnetized so that the permanent magnets adjacent to each other have poles reverse to each other (see FIG. 1).

Figure 5:
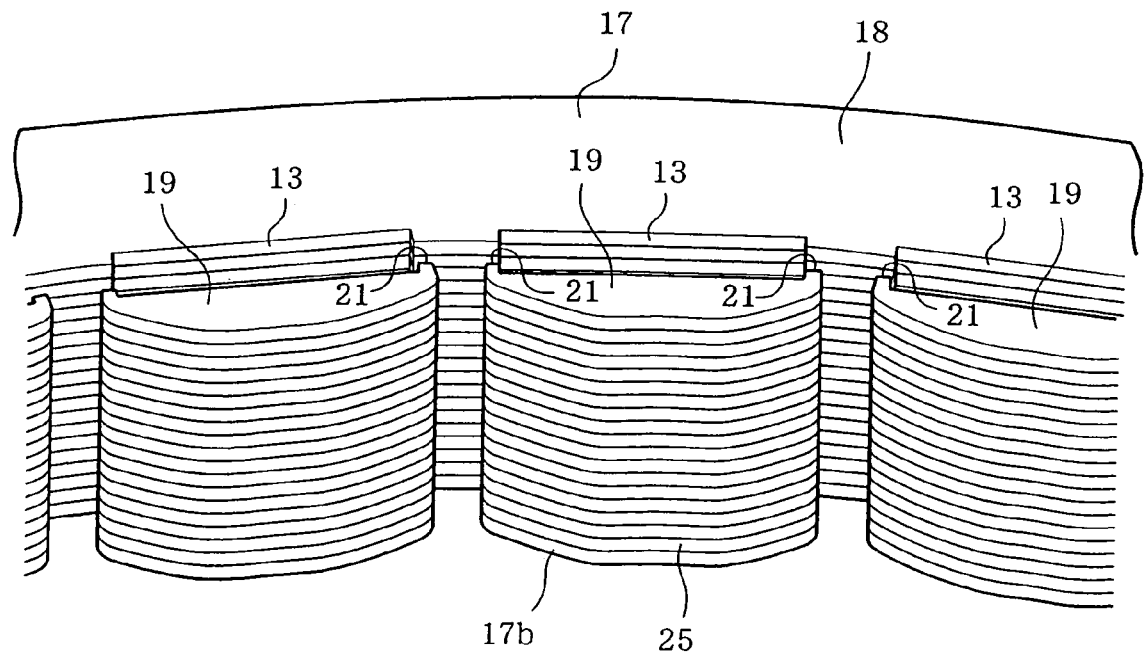
FIG. 5 is a perspective view of the divided core pieces with an uppermost steel sheet being removed.

Each divided core piece 16 is composed of steel plates 17 stacked on one another. The steel plates 17 include steel plates 17a and 17b located at upper and lower ends in a stacking direction respectively. Both peripheral ends of each magnetic pole section 19 are connected via connecting portions 20 to the yoke 18 in each of the steel plates 17a and 17b as shown in FIG. 4. However, the other steel plates 17 located between the steel plates 17a and 17b have no connecting portions connecting between the magnetic pole sections 19 and the yoke portion 18 as shown in FIG. 5. Notches 21 are formed in both peripheral ends of the magnetic pole sections 19 in the steel plates 17 located between the steel plates 17a and 17b respectively. FIG. 5 shows the stacked steel plates 17 with the upper end steel plate 17a being removed. The steel plates 17 including the upper and lower steel plates 17a and 17b are connected in the yoke portions 18 and magnetic pole sections 19 to one another by calked portions 22 and 23 (see FIG. 4).

Figure 1:
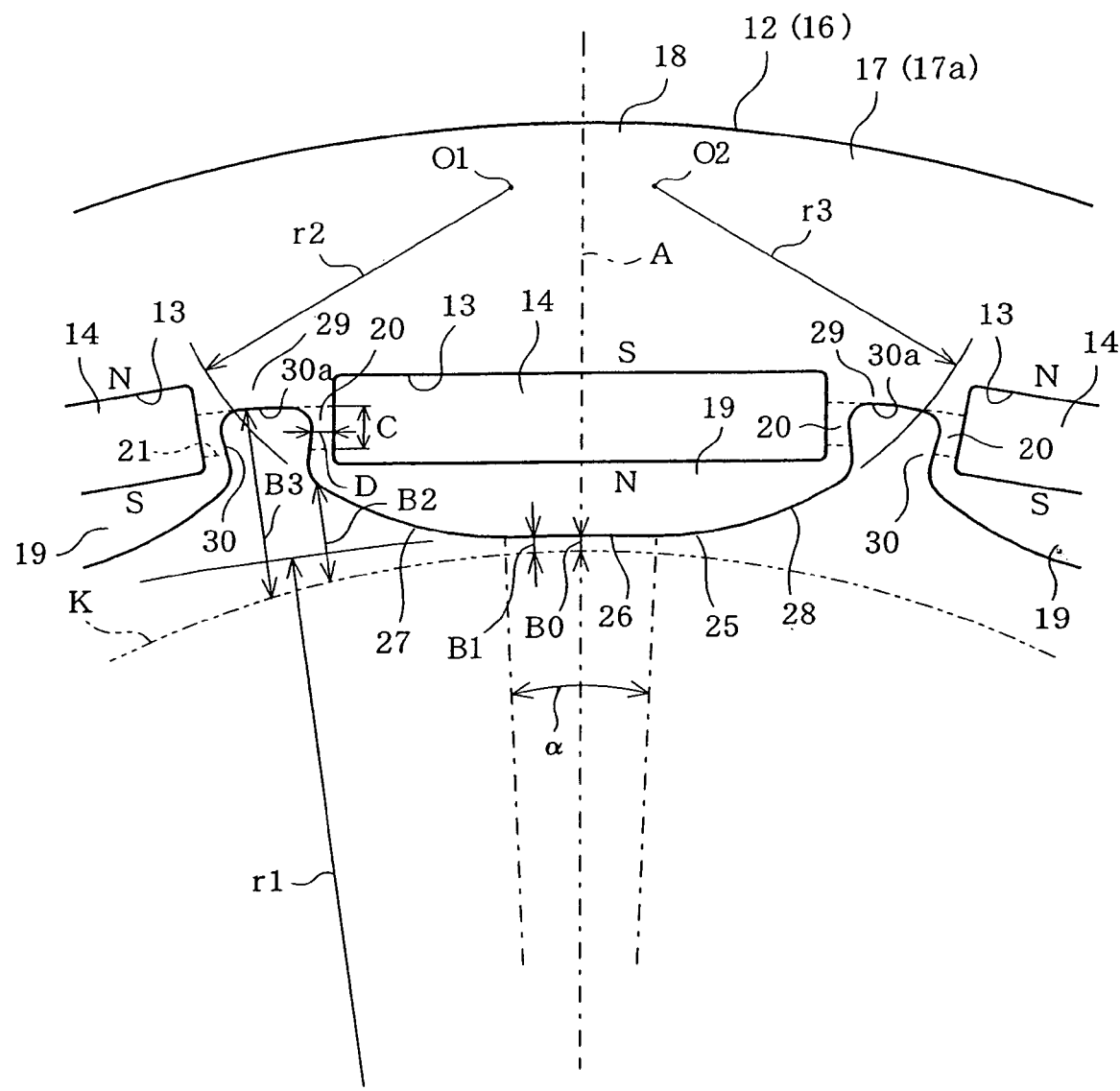
FIG. 1 is a plan view of a magnetic pole section of a rotor core of a permanent magnet motor in accordance with one illustrative aspect of the present invention.

Referring now to FIG. 1, a magnetic pole face 25 of each magnetic pole section 19 will be described in detail. The magnetic pole face 25 opposes the stator 1 from the radial direction and includes a first circular arc face 26 formed in a peripherally central part of the magnetic pole, and second and third circular arc faces 27 and 28 formed in both peripheral sides of the first face 26 respectively. The first face 26 is on a magnetic pole axis A passing a center of magnetic pole and a center of rotation of the rotor 10 and is a circular arc face (see arrow indicative of radius r1 in FIG. 1) having a center at the side of the rotation center of the rotor 10. The first face 26 has a range α from ±15 degrees to ±35 degrees in electrical angle about a center of the magnetic pole (magnetic pole axis A). The first face 26 has such a circular arc shape that a gap width B1 between the stator 1 and the first face 26 is increased by about 10% relative to a minimum gap width B0 as shown in FIG. 1. Two-dot chain line K designates an outermost radius line of the stator 1 in FIG. 1.

The second and third faces 27 and 28 are shifted peripherally from the magnetic pole axis A and are formed into circular arc faces (see arrows indicative of radii r2 and r3 in FIG. 1) having centers O1 and O2 on the yoke 18. Each of the second and third faces 27 and 28 has such a shape that a maximum gap width at the boundary side of the magnetic pole is three times as large as a minimum gap width B0 or above.

In the stacked steel plates 17, a magnetic pole boundary 29 between the magnetic pole sections 19 adjacent to each other is formed with a groove 30 recessed radially outward relative to each of the second and third faces 27 and 28 as shown in FIG. 1. A gap width B3 between the stator 1 and an innermost wall or bottom 30a is set so as to be larger than a maximum gap width B2 of each of the second and third faces 27 and 28 (B3>B2). In this case, each of the upper and lower end steel plates 17a and 17b has the connecting portion 20 between the magnet insertion hole 13 and the groove 30. Each of the other steel plates 17 has the notch 21 communicating the magnet insertion hole 13 with the groove 30. Accordingly, each divided core piece 16 has the notch 21 which is located between the magnet insertion hole 13 and the groove 30, is a part of the steel plate 17 with respect to the direction in which the steel plates 17 are stacked, and communicates the magnet insertion hole 13 with the groove 30. A radial dimension C of the notch 21 is set so as to be equal to or larger than the aforesaid minimum gap width B0 (C<B0). Each connecting portion 20 has a peripheral dimension B set to 0.5 mm. Molding resin 15 fills a space between an inner face of each magnet insertion hole 13 and an outer face of the permanent magnet 14 inserted in the hole 13, the notch 21 and the groove 30 of the magnetic pole boundary 29, whereby the steel plates and the permanent magnets are secured together and reinforced by the resin.

According to the above-described construction, the first face 26 is formed on the peripherally central part of each magnetic pole face 25 of the rotor core 12. The first face 26 is formed into the circular arc face having a substantially uniform gap width with respect to a peripheral direction. Accordingly, differing from the foregoing second conventional construction, the construction of the embodiment can avoid concentration of magnetic flux. Furthermore, the second and third faces 27 and 28 are formed on both peripheral sides of the first face 26 respectively. Each of the second and third faces 27 and 28 has the gap between the stator 1 and each face, and a gap width is rendered larger as each face comes close to a boundary between the magnetic poles. Consequently, the magnetic flux density distribution of the gap can be approximated to a sinusoidal wave as close as possible, with the result of improvement in the torque development characteristic and reduction in the oscillation and noise.

In the foregoing embodiment, the first face 26 has a range a from ±15 degrees to ±35 degrees in electrical angle about a center of the magnetic pole. The first face 26 has such a circular arc shape that a gap width B1 between the stator 1 and the first face 26 is increased by about 10% relative to the minimum gap width B0. Each of the second and third faces 27 and 28 has such a shape that the maximum gap width at the boundary side of the magnetic pole is three times as large as the minimum gap width B0 or above. Consequently, the magnetic flux density distribution of the gap can further be approximated to a sinusoidal wave.

The magnetic pole boundary 29 between the magnetic pole sections 19 adjacent to each other is formed with the groove 30. The gap width B3 between the stator 1 and the bottom 30*a* is set so as to be larger than the maximum gap width B2 of each of the second and third faces 27 and 28. As a result, since the magnetic resistance of a short-circuit magnetic path through the connecting portion 20 is increased, effective flux linkage linked to the stator 1 side can be increased. Furthermore, the steel plates 17 located between the upper and lower end steel plates 17*a* and 17*b* have no connecting portions. The notches 21 are formed in both peripheral ends of the magnetic pole sections 19 in the steel plates 17 located between the steel plates 17*a* and 17*b*. Consequently, since the magnetic resistance is further increased in the portion, the effective flux linkage can further be increased. Additionally, the aforesaid effect can still further be increased when the radial dimension C of the notch 21 is set so as to be equal to or larger than the aforesaid minimum gap width B0.

The rotor core 12 is divided into a plurality of peripherally divided core pieces 16 connected to one another. Each divided core piece 16 is formed by stacking a plurality of steel plates. As the result of the aforesaid construction, the steel plate can be use more effectively as compared with the case where the rotor core 12 is made by stacking annular steel plates. When the annular steel plates are used, an amount of unused part of the steel plate is larger, whereupon an amount of loss is increased. In the foregoing embodiment, however, an amount of loss in a steel plate can be reduced as small as possible.

Furthermore, the permanent magnets 14, the rotor core 12 and the frame 11 are secured together by the resin 15 by molding in the foregoing embodiment. Consequently, these components can be fixed rigidly.

When the above-described permanent magnet motor 100 is employed as a drive source of an agitator 102 and a rotating tub 103 in an automatic washing machine 101, oscillation and noise can be reduced in the automatic washing machine.

The invention should not be limited to the above-described embodiment but may be modified or expanded as follows. The invention is applied to the permanent magnet motor 100 of the outer rotor type in the foregoing embodiment. However, the invention may be applied to a permanent magnet motor of the inner rotor type in which a rotor is disposed inside a stator. Furthermore, the automatic washing machine 101 of the vertical axis type exemplified above comprises the rotating tub 103 rotated about a vertical axis in the foregoing embodiment. However, the invention may be applied to a drum type washing machine comprising a rotating tub rotated about a substantially horizontal axis. In this case, the above-described permanent magnet motor 100 is employed as a drive source for the rotating tub.

The permanent magnet motor of the invention may be used as a drive source for driving a drum or rotating tub provided so as to be rotatable about a substantially horizontal axis.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A permanent magnet motor comprising:

a stator;

a rotor including a rotor core made by stacking a plurality of steel plates and having a plurality of magnetic insertion holes aligned peripherally and a plurality of permanent magnets of a plurality of magnetic poles serving as field magnets and inserted in the magnetic insertion holes respectively, wherein the rotor core includes a plurality of magnetic pole sections further including magnetic pole faces opposing the stator from a radial direction with a gap between the stator and the magnetic pole faces, each magnetic pole section having both peripheral ends and including first to third faces, the first face being formed substantially on a peripherally central part thereof and having a substantially peripherally uniform width of the gap, the first face being formed substantially into a circular arc shape, each of the second and third faces being formed on both peripheral ends thereof respectively and having a width of the gap which is rendered larger as each of the second and third faces comes close to a boundary between the magnetic poles; and the first face ranges from ±15 degrees to ±35 degrees in electrical angle about a center of the magnetic pole and has such a circular arc shape that the gap width is increased by about 10% relative to a minimum gap width and each of the second and third faces has such a shape that a maximum gap width at the boundary side of the magnetic pole is three times as large as the minimum gap width or above.

2. A permanent magnet motor comprising:

a stator;

a rotor including a rotor core made by stacking a plurality of steel plates and having a plurality of magnetic insertion holes aligned peripherally and a plurality of permanent magnets of a plurality of magnetic poles serving as field magnets and inserted in the magnetic insertion holes respectively, wherein the rotor core includes a plurality of magnetic pole sections further including magnetic pole faces opposing the stator from a radial direction with a gap between the stator and the magnetic pole faces, each magnetic pole section having both peripheral ends and including first to third faces, the first face being formed substantially on a peripherally central part thereof and having a substantially peripherally uniform width of the gap, the first face being formed substantially into a circular arc shape, each of the second and third faces being formed on both peripheral ends thereof respectively and having a width of the gap which is rendered larger as each of the second and third faces comes close to a boundary between the magnetic poles;

each of the first to third faces has a circular arc shape and each magnetic pole face includes the first to third circular arc-shaped faces; and each of the second and third faces is a circular arc having a center thereof at a location peripherally shifted from a magnetic pole axis passing a center of the magnetic pole.

3. A permanent magnet motor comprising:

a stator;

a rotor including a rotor core made by stacking a plurality of steel plates and having a plurality of magnetic insertion holes aligned peripherally and a plurality of permanent magnets of a plurality of magnetic poles serving as field magnets and inserted in the magnetic insertion holes respectively, wherein the rotor core includes a plurality of magnetic pole sections further including magnetic pole faces opposing the stator from a radial direction with a gap between the stator and the magnetic pole faces, each magnetic pole section having both peripheral ends and including first to third faces, the first face being formed substantially on a peripherally central part thereof and having a substantially peripherally uniform width of the gap, the first face being formed substantially into a circular arc shape, each of the second and third faces being formed on both peripheral ends thereof respectively and having a width of the gap which is rendered larger as each of the second and third faces comes close to a boundary between the magnetic poles;

the rotor core has a magnetic pole boundary formed with a groove which has a larger gap width than a maximum gap width of each of the second and third faces;

the rotor core has a notch formed therein between the magnet insertion hole and the groove so that the magnet insertion hole and the groove communicate with each other in an entire or part of steel plates in a stacking direction; and the notch has a radial dimension larger than the minimum gap width.

4. A washing machine having a rotating tub, including:

a permanent magnet motor for rotating the rotating tub, the motor comprising:

a stator; and a rotor including a rotor core made by stacking a plurality of steel plates and having a plurality of magnetic insertion holes aligned peripherally and a plurality of permanent magnets of a plurality of magnetic poles serving as field magnets and inserted in the magnetic insertion holes respectively, wherein the rotor core includes a plurality of magnetic pole sections further including magnetic pole faces opposing the stator from a radial direction with a gap between the stator and the magnetic pole faces, each magnetic pole section having both peripheral ends and including first to third faces, the first face being formed substantially on a peripherally central part thereof and having a substantially peripherally uniform width of the gap, the first face being formed substantially into a circular arc shape, each of the second and third faces being formed on both peripheral ends thereof respectively and having a width of the gap which is larger as each of the second and third faces comes close to a boundary between the magnetic poles; and the first face ranges from ±15 degrees to ±35 degrees in electrical angle about a center of the magnetic pole and has such a circular arc shape that the gap width is increased by about 10% relative to a minimum gap width and each of the second and third faces has such a shape that a maximum gap width at the boundary side of the magnetic pole is three times as large as the minimum gap width or above.

5. A washing machine having a rotating tub, including:

a permanent magnet motor for rotating the rotating tub, the motor comprising:

a stator; and a rotor including a rotor core made by stacking a plurality of steel plates and having a plurality of magnetic insertion holes aligned peripherally and a plurality of permanent magnets of a plurality of magnetic poles serving as field magnets and inserted in the magnetic insertion holes respectively, wherein the rotor core includes a plurality of magnetic pole sections further including magnetic pole faces opposing the stator from a radial direction with a gap between the stator and the magnetic pole faces, each magnetic pole section having both peripheral ends and including first to third faces, the first face being formed substantially on a peripherally central part thereof and having a substantially peripherally uniform width of the gap, the first face being formed substantially into a circular arc shape, each of the second and third faces being formed on both peripheral ends thereof respectively and having a width of the gap which is larger as each of the second and third faces comes close to a boundary between the magnetic poles;

each of the first to third faces has a circular arc shape and each magnetic pole face includes the first to third circular arc-shaped faces; and each of the second and third faces is a circular arc having a center thereof at a location peripherally shifted from a magnetic pole axis passing a center of the magnetic pole.

6. A washing machine having a rotating tub, including:

a permanent magnet motor for rotating the rotating tub, the motor comprising:

a stator; and a rotor including a rotor core made by stacking a plurality of steel plates and having a plurality of magnetic insertion holes aligned peripherally and a plurality of permanent magnets of a plurality of magnetic poles serving as field magnets and inserted in the magnetic insertion holes respectively, wherein the rotor core includes a plurality of magnetic pole sections further including magnetic pole faces opposing the stator from a radial direction with a gap between the stator and the magnetic pole faces, each magnetic pole section having both peripheral ends and including first to third faces, the first face being formed substantially on a peripherally central part thereof and having a substantially peripherally uniform width of the gap, the first face being formed substantially into a circular arc shape, each of the second and third faces being formed on both peripheral ends thereof respectively and having a width of the gap which is larger as each of the second and third faces comes close to a boundary between the magnetic poles;

the rotor core has a magnetic pole boundary formed with a groove which has a larger gap width than a maximum gap width of each of the second and third faces;

the rotor core has a notch formed therein between the magnet insertion hole and the groove so that the magnet insertion hole and the groove communicate with each other in an entire or part of steel plates in a stacking direction; and the notch has a radial dimension larger than the minimum gap width.

* * * * *